July 23, 1940.    R. TAESLER    2,209,178
MOTION PICTURE CAMERA
Filed Feb. 24, 1939
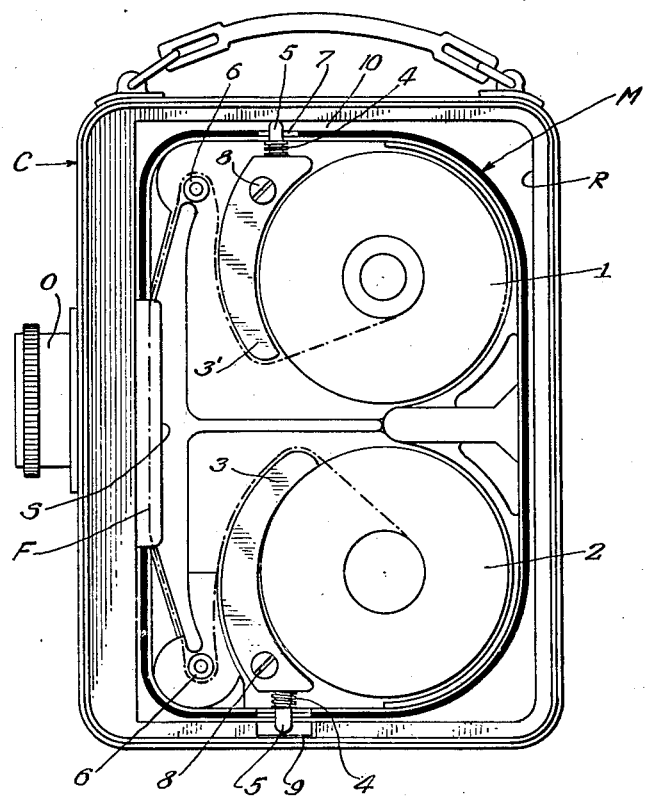
Inventor
Rudolf Taesler Patented July 23, 1940

2,209,178

UNITED STATES PATENT OFFICE 2,209,178

MOTION PICTURE CAMERA

Rudolf Taesler, Dresden, Germany, assignor to Zeiss Ikon Aktiengesellschaft, Dresden, Germany Application February 24, 1939, Serial No. 258,295
In Germany February 23, 1938

5 Claims. (Cl. 88—17)

This invention relates to improvements in motion picture cameras.

It is an object of the invention to control the speed of the film by causing a brake to act on the take-up reel, and by directing the film with respect to said brake in such manner that the film itself while running up on the take-up reel applies the brake to the take-up reel.

It is also an object of the invention to position brakes in potentially operative relation to the unwinding reel as well as to the take-up reel, but rendering the brake inoperative with respect to the reel which happens to be used as unwinding reel.

In motion picture apparatus in which no equalizing rolls are used, the defect occurs that the film running from the unwinding roll is excessively tensioned while passing the exposure window, whereby the film is fed at each movement, or at some movements, a distance greater than that required for advancing the film over the length of a single picture frame. This again has the disadvantage that the location of the pictures on the film is not definitely determined with respect to adjacent pictures. Upon projecting pictures from a film produced in this manner, the pictures seem to jump or dance on the screen, or show a disturbing flicker condition.

In order to overcome this defect, the present invention has the object of braking the movement of the take-up reel. The brake is under control of the film itself.

The invention is particularly of use in motion picture apparatus utilizing magazines, in which the unwinding reel and the take-up reel are disposed. When making small pictures only, as for instance, 8 mm. pictures on a 16 mm. film, it is customary to turn the magazine through 180 degrees when the entire length of film has passed through the apparatus and is wound up on the take-up reel. The latter then becomes the unwinding reel for the second series of exposures, on that portion of the film which had been protected against exposure in the first run.

It is for this reason that a brake is disposed adjacent each film reel, as either may become the take-up reel in successive operations.

The invention, therefore, also has the object of rendering either of these brakes inoperative depending upon the upright or inverted position respectively in which the magazine is used.

With these and numerous other objects in view, an embodiment of the invention is illustrated in the accompanying drawing and is described in the following specification in which reference is made to the drawing.

The drawing shows in front elevation the interior of a motion picture camera and the interior of a magazine operatively inserted therein.

The casing C of the motion picture camera is equipped with a lens O and with a cover or the like permitting the insertion of a magazine, while the film within the magazine is protected against exposure. The construction of the casing and other parts as finder, etc. as well as the details of the film feeding mechanism and shutter do not form part of the present invention and are not illustrated in the drawing.

The magazine M indicated by the heavy contour lines is insertible into the interior of the housing to be seated in a recess R in such location with respect to the lens of the camera that a slit S in the magazine housing is directed towards the lens and permits the light passing through the lens to act upon a portion of the film having in each exposure a predetermined length and occupying approximately the half width of the film.

The film F is unwound from the unwinding reel 1 which is located within the magazine and is wound after passage through the slot S on the take-up reel 2 also within the magazine and actuated in some suitable way to pull the film in intermittent movements past the slot S. The actuation of the take-up reel 2 or of the other reel does not form part of the present invention. The film F is guided over guide rollers 6 which are mounted within the magazine at fixed distances from the upper wall and front wall thereof to cause the film to move uniformly in loops as is well known in the art.

In the embodiment illustrated, the take-up reel 2 is the lower reel and in order to apply uniform tension to the film and to cause it to move intermittently uniform distances, a brake lever 3 is mounted within the magazine, said lever being pivoted about the pivot screw 8 and being under control of a spring 4 which has a tendency to urge the brake lever to inoperative position with respect to the circumference of the take-up reel 2. The film being guided by the guide roller 6 and by the take-up reel, passes over the free end of the lever, and owing to the pull exerted on the film by the take-up reel, the brake lever is applied against the circumferential edge of the flanges of the reel, thereby rendering the movement of the take-up reel uniform. The lever 3 is of arcuate shape to contact a circumferential portion of the flanges of the reel 2 when applied against the same.

A similar brake lever 3' also occupies a similar position with respect to the unwinding reel and also is pivotally supported by the screw pin 8 within the magazine.

The spring 4 which yieldingly controls the lever rests at its end against the lever and against a projection on a pin 5 which extends through a slit 7 in the magazine outwardly.

In the position indicated the pin 5 associated with the brake lever 3' is urged inwardly towards the magazine owing to the engagement of the outer end of this pin with the wall of the recess in which the magazine M is operatively seated. This wall, therefore, acts as a stop forcing the pin 5 and spring mounted thereon into a position in which the lever 3' is urged away from the unwinding reel 1. The pin 5 of the lever 3 cooperating with the take-up reel 2, however, does not engage any stop and said pin, therefore, projects into an extension 9 of the recess in which the magazine M is located. The lever 3, therefore, is not urged away from the pertaining reel 2 and is not influenced at all by the spring 4 but solely by the film 3, which film exerts a pressure on the lever to force it against the circumference of the reel 2.

Owing to this arrangement, it will be seen that the reel which occupies the position of the take-up reel is automatically braked by the film during the operation of the camera and that upon inversion of the magazine for exposing the portion of the film which had not been exposed during the first run, the reel which previously had been the unwinding reel becomes the take-up reel and automatically the brake 3' for said last named reel will be applied by the film and will be released from those means which yieldingly urge the brake in spaced position with respect to said reel.

I claim:

1. In a reversible magazine for motion picture cameras, the combination of a flanged take-up reel, a flanged unwinding reel, means for braking the movement of the take-up reel controlled by the film, means for braking the unwinding reel, both said braking means engaging in their operative position the circumference of the flanges of their respective reel and means for retaining the braking means for the unwinding reel normally inoperative.

2. In a motion picture camera the combination of a reversible magazine insertable into the camera in operative relation thereto in two different positions, two flanged film reels in said magazine, either of said reels being a take-up reel when the other is an unwinding reel in each of said positions, brake means controllable by the film for each of said reels, and engaging in their operative position the flanges of their respective reel and means for rendering the brake means inoperative for that reel which in the operative position selected for the magazine happens to be the unwinding reel.

3. In a magazine for a motion picture camera, the combination of a pair of reels provided with flanges, brake means for said reels and adapted to be moved by the film in engagement with the flanges of said reels, and means operable upon insertion of the magazine into the camera for rendering one of said brake means inoperative.

4. In a magazine for a motion picture camera, the combination of a pair of film reels, brake levers pivoted in the magazine adjacent the reels and extending along a portion of the circumference of said reels, spring means for normally keeping said brake levers spaced from the reels, means for guiding the film over both brake levers, and means adapted to engage the camera when the magazine is inserted in the same for maintaining one of said brake levers in its inoperative position, while the other brake lever is urged by the moving film against the action of said spring means in braking engagement with its associated reel.

5. In a magazine for a motion picture camera, the combination of a pair of reels, brake levers in the magazine pivoted adjacent the reels, springs associated with each brake lever, pins about which the springs are placed, the camera having an abutment engageable with either pin and having a recess for the other pin, and means in the magazine for guiding the film over both brake levers, whereby the film guided over the brake lever whose pin is seated in the recess of the camera applies the brake lever to the pertaining reel.

RUDOLF TAESLER.